United States Patent
Bostad et al.

[15] 3,662,849
[45] May 16, 1972

[54] MOUNTING ARRANGEMENT FOR VEHICLE DRIVE TRAIN

[72] Inventors: Wayne W. Bostad; Ralph F. Golik, both of Portland, Oreg.

[73] Assignee: Hyster Company, Portland, Oreg.

[22] Filed: Sept. 23, 1969

[21] Appl. No.: 860,215

[52] U.S. Cl. .................................... 180/54 E, 180/88
[51] Int. Cl. .................................................. B60k 5/12
[58] Field of Search .............. 180/54 E, 54 F, 1 F, 75, 88, 180/70, 73, 64, 55–63; 187/9

[56] References Cited

UNITED STATES PATENTS

| 2,299,445 | 10/1942 | Weaver | 180/54 X |
| 2,471,429 | 5/1949 | Hawkins | 180/54 |
| 1,720,064 | 7/1929 | Smith | 180/73 |
| 2,806,543 | 9/1957 | Nallinger | 180/73 D |

FOREIGN PATENTS OR APPLICATIONS

| 275,685 | 6/1914 | Germany | 180/75 |

Primary Examiner—Benjamin Hersh
Assistant Examiner—Milton L. Smith
Attorney—Buckhorn, Blore, Klarquist & Sparkman

[57] ABSTRACT

A lift truck has a short coupled unitized drive train including engine, transmission, differential gearing, axle shafts and drive wheels drivingly interconnected without universal joints. Split axle housings are connected rigidly to the truck frame and rotatably support the axle shafts and drive wheels. Rubber isolators support the engine block on the frame. A differential housing has sleeve portions which extend between the axle shaft and axle housing. Elastomer bushings separate the differential sleeves from the axle housings but resiliently support the differential housing on such axle housings, thereby isolating the differential housing and rigidly connected transmission housing and engine block from wheel loads and brake torque transmitted from the drive wheels to the axle housing and frame.

14 Claims, 4 Drawing Figures

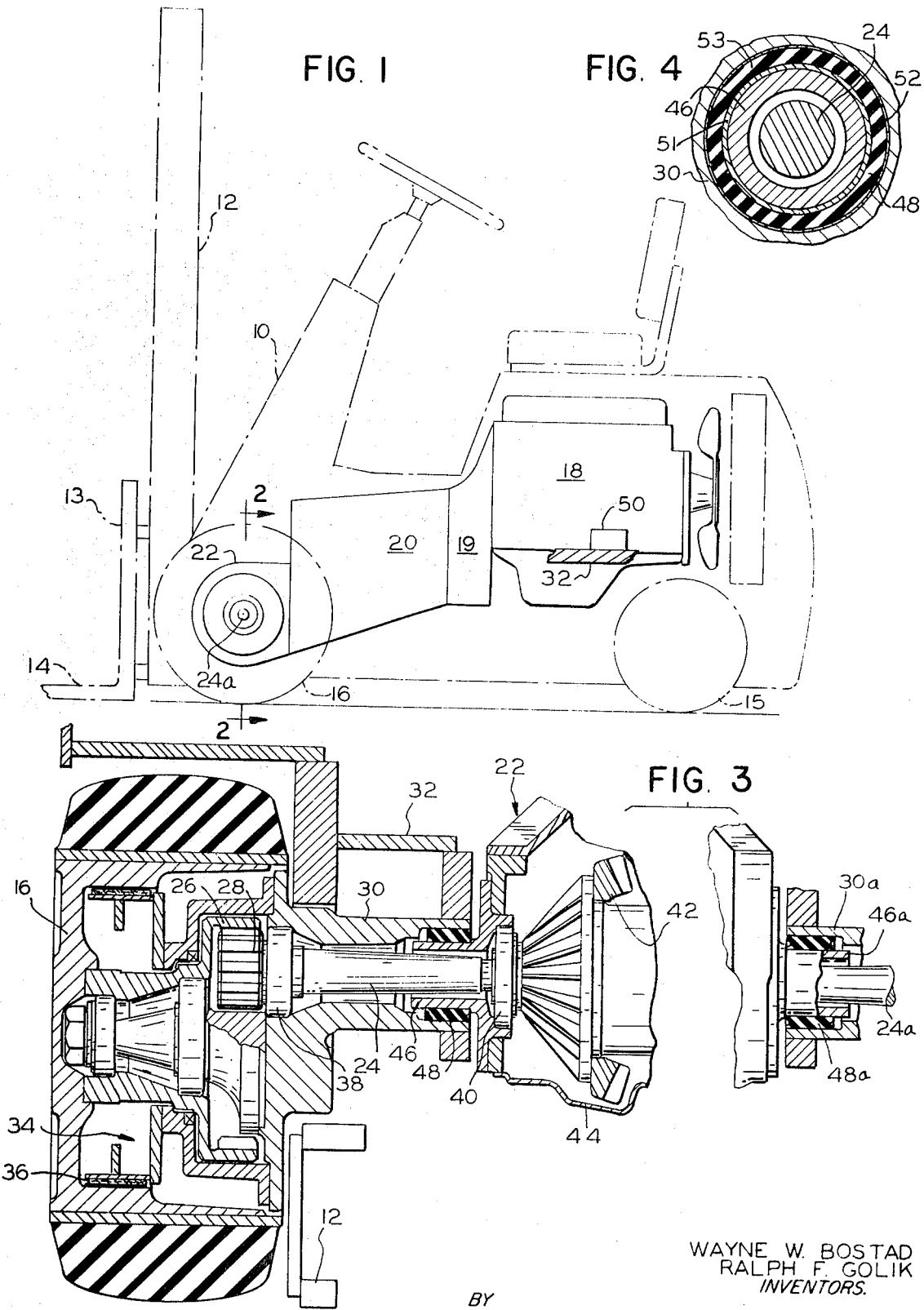

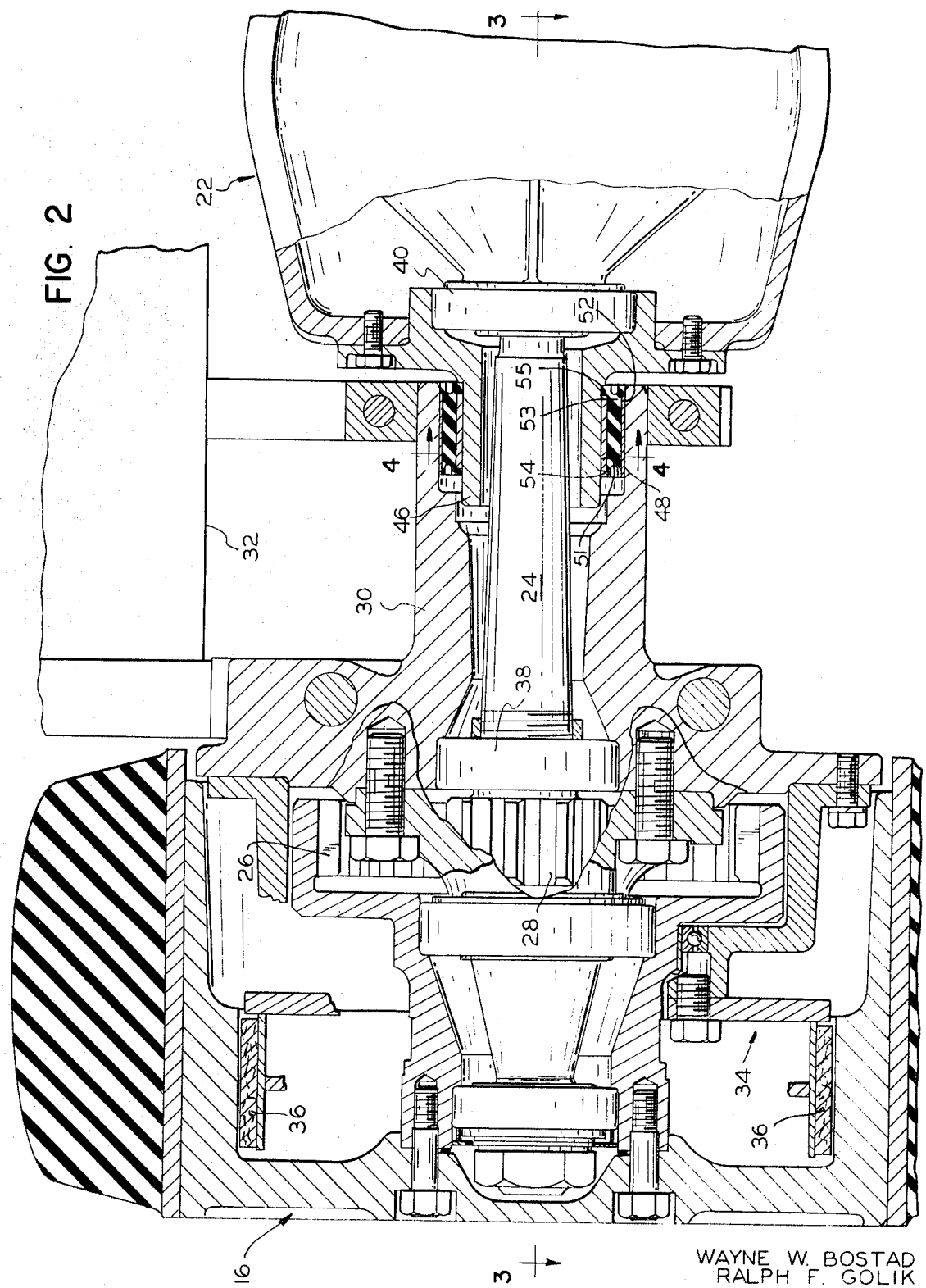

MOUNTING ARRANGEMENT FOR VEHICLE DRIVE TRAIN

BACKGROUND OF THE INVENTION

1. Field of the Invention

The present invention relates to a mounting arrangement for the drive train of a traction vehicle. It more particularly relates to a mounting arrangement for isolating housing components of a unitized drive train from road shocks and other such wheel loads and braking torque usually transmitted by the drive wheels to the axle housing or frame of a load-handling vehicle such as an industrial lift truck.

2. Description of the Prior Art

In most conventional motor-driven highway vehicles non-torsional wheel loads are isolated from many components of the drive train by universal joints. The differential housing is usually supported by the axle housing. Wheel and brake loads transmitted to the axle housing by the drive wheels are usually isolated from the frame by springs, shock absorbers, or equivalent means.

However, because of the space limitations of small lift trucks, they commonly have a short coupled so-called unitized power train having no universal joints. The axle housings, differential housing, transmission casing and engine block of such unitized power trains are usually rigidly interconnected. Moreover, because of stability requirements, such lift trucks commonly have their axle housings mounted rigidly to the frame with the drive wheels and axle shafts being rotatably but otherwise rigidly connected to the axle housing. Thus heavy drive wheel shock loads and braking torques are transmitted through the axle housing or frame directly to the differential housing, transmission casing and engine block and thence to their internal components, and therefore can impose high stresses on the unitized drive train.

SUMMARY OF THE INVENTION

In the present invention the foregoing problems of prior art industrial trucks are overcome by isolating or at least separating the differential housing as well as the engine block from the axle housing and frame of the truck. Thus wheel loads and braking forces are isolated from the differential housing, engine block and power train components supported thereby, and stresses on these housings and their internal components are minimized. Bushings interposed between the differential housing and the axle housing provide torsional and linear freedom of movement of the differential housing with respect to the frame and axle housing. Preferably these bushings are elastomer for optimum isolating effect.

Principal objects of the invention are to provide:

1. rotational and linear freedom of movement of the differential housing with respect to the axle and frame of a traction vehicle;
2. isolation of drive wheel, axle and frame loads from the differential housing, transmission housing and engine block of a traction vehicle having a unitized power train and consequential reduction of stresses on their internal drive train components;
3. isolation of torsional braking forces from the differential housing, engine block and transmission housing of a traction vehicle having a unitized power train;
4. reduction of engine vibration in a traction vehicle having a unitized power train;
5. auxiliary support of the differential housing on the frame in the event of failure of the means isolating the differential from the axle and frame of a traction vehicle; and
6. separation between the differential housing on the one hand and axle housing and frame on the other hand providing limited rotational and linear freedom of movement between the differential housing and its supporting structural components.

BRIEF DESCRIPTION OF THE DRAWINGS

The foregoing and other objects and advantages of the invention will become more apparent from the following detailed description which proceeds with reference to the accompanying drawings wherein:

FIG. 1 is a schematic side view of a short-coupled unitized power train of a lift truck and a mounting arrangement therefor in accordance with the invention;

FIG. 2 is an enlarged partial vertical sectional view taken along the line 2—2 of FIG. 1;

FIG. 3 is a horizontal sectional view taken along the line 3—3 of FIG. 2 on a smaller scale than FIG. 2; and FIG. 4 is a vertical sectional view taken along the line 4—4 of FIG. 2.

With reference to the drawings, FIG. 1 discloses in phantom a typical lift truck 10 including the usual upright mast structure 12 with load carriage 13 and connected forks 14 movable vertically on the mast. Rear wheels 15 and front drive wheels 16 support the truck on the ground surface.

The truck is powered by a unitized drive train including engine 18, flywheel housing 19, transmission 20 and a differential indicated generally at 22, with their respective housings rigidly interconnected. The drive train also includes a pair of axle shafts 24, 24a (FIG. 3) connected at their outer ends to the previously mentioned drive wheels 16. The unitized drive train is characterized by the absence of universal joints or other flexible connections between the various power transmitting components.

With reference to FIGS. 2 and 3 showing the right front drive wheel 16, each drive wheel includes an internal gear 26 drivingly connected to a gear 28 on the outer end of axle shaft 24. The left drive wheel has an identical driving connection (not shown) to its axle shaft 24a. An axle housing 30, 30a surrounds each axle shaft 24, 24a and is rigidly connected to the frame 32 of the truck. Each axle housing carries a brake assembly 34 for its associated drive wheel which transmits braking force to the wheel through brake bands 36. Thus braking torque is transmitted from the drive wheels directly to the axle housings and thus to the rigidly connected vehicle frame.

Axle shaft 24 is rotatably supported by an outer spherical bearing member 38 carried by axle housing 30 and by an inner bearing member 40 carried by differential 22. Axle shaft 24a is similarly supported by axle housing 30a and the differential. Thus wheel loads are transmitted by the drive wheels through axle shafts 24, 24a, their outer bearings 38, and axle housings 30, 30a directly to frame 32, without any provision for isolation between the drive wheels and frame.

Differential 22 includes differential gearing 42 mounted within a differential housing 44 and drivingly connected to the inner ends of axle shafts 24, 24a. A pair of differential housing sleeve extensions 46, 46a are bolted to housing 44. Such sleeves extend in surrounding relationship to axle shafts 24, 24a and between such shafts and their respective axle housings 30, 30a. One of a pair of annular elastomer bushings 48, 48a extends between each axle housing and its differential housing sleeve to separate the differential housing from the axle housings. These bushings wholly support the differential housing on the axle housing and, indirectly, on the frame.

With reference to FIGS. 2 and 4, each bushing 48, 48a includes an inner metal liner 51, an outer metal liner 52, and an elastomer body 53 sandwiched between the inner and outer liners. Elastomer body 53 includes shoulder seal portions 54, 55 covering edges of the liners. The bushings are press-fitted within the bores of axle housings 30, 30a and slip-fitted over differential housing sleeves 46, 46a.

The resilient nature of the elastomer body of bushings 48, 48a permits limited freedom of movement of the differential housing relative to the axle housings in directions normal to the axis of the axle shafts and remainder of the power train. Thus loads imposed on the drive wheels and transmitted directly to the axle housings and frames, whether by impact or payloads on the truck, are effectively isolated from the differential housing and therefore have substantially no effect on the differential gearing. Spherical bearings 38 and the geared connection of the axle shafts with their respective drive wheels provide flexibility between the axle shafts and their axle housings to contribute to the effectiveness of the bushings in permitting relative movement between the differential housing and axle housings.

Bushings 48, 48a also permit relative twisting movement between the axle housings and differential housing sleeves. Thus such bushings also isolate the differential housing from torsional loading of the axle housings and frame by braking and other torsional forces.

Referring again to FIG. 1, engine 18 is also supported on frame 32 by rubber isolators 50. The transmission and flywheel housings are suspended between the differential housing and engine. Therefore braking torque, road shocks and other externally imposed wheel loads imposed on the drive wheels and transmitted to axle housings and frame are also isolated from the engine, flywheel housing and transmission casing. Accordingly, excessive stressing of drive train components within such housings due to such loads is avoided.

The specific mounting arrangement shown also has an advantage in the event of bushing failure. In such event, the differential housing sleeves 46, 46a would drop onto their axle housings 30, 30a and become supported thereby to avoid damage to moving parts of the drive train.

Although the bushings are preferably formed of a resilient elastomer material as described, they could also be made of a more rigid metal or metal alloy material with lesser isolating effect. Nevertheless, such a rigid bushing would still provide separation between the differential and axle housing and therefore a limited flexibility between the housings with some isolating effect. Such a rigid bushing would also provide a degree of rotational freedom between the two housings and therefore isolation from loading of the axle housings in torque.

In an alternative mounting arrangential housing 44 could be mounted directly on frame 32 rather than on the axle housings. In such event an equivalent (not shown) of the elastomer bushing supports 48, 48a would resiliently connect the differential housing to frame 32, with such housing remaining spaced from the pair of axle housings. Thus, in effect the differential housing would remain isolated from both the frame and the axle housing by the resilient connection.

"Wheel loads" as used throughout the specification and claims has reference to loads imposed on the wheels by external forces such as road shocks, variations in loading and other forces usually resisted by the axle housing, and not to normal driving torque transmitted to the wheels through the drive train.

Having shown and described a preferred embodiment as illustrative of the principles of our invention, it should be apparent that the same permits of modification in arrangement and detail. Our intention is not to limit our invention to the specific embodiments disclosed, but to include within its scope all such modifications and equivalent constructions.

We claim:

1. In a ground-engaging traction vehicle having a frame, drive wheel means supported by an axle housing means connected to said frame, and a drive train including an engine, transmission means, differential means including a differential housing and axle shaft means for transmitting rotary power from said engine means to said drive wheel means,
a drive train mounting arrangement comprising:
first connector means connecting said axle housing means to said frame in a manner so as to prevent any substantial vertical oscillation of said axle housing with respect to said frame,
second connector means including first isolator means resiliently connecting said engine means to said frame,
and means supporting said differential housing on said frame including second isolator means interposed between said differential housing and said frame in a manner so as to provide a resilient support for said differential housing on said frame, and so as to isolate said differential housing from said axle housing means and said frame so that wheel loads transmitted by said drive wheel means to said axle housing means and said frame are isolated from said engine and differential housing.

2. A mounting arrangement according to claim 1 wherein said differential housing includes means supporting said differential housing on said axle housing means in a manner such that said axle housing means supports said differential housing on said frame, said second isolator means being interposed between said differential housing and said axle housing means to isolate said differential housing from loads imposed on said axle housing means.

3. Apparatus according to claim 2 wherein said second isolator means comprises the only direct connection between said axle housing means and said differential housing.

4. A mounting arrangement according to claim 1 wherein said second isolator means isolates said differential housing from both torsional and linear loads transmitted by said drive wheel means to said axle housing means or frame.

5. A mounting arrangement according to claim 1 wherein said second isolator means mounts said differential housing in a manner permitting both rotational motion and linear motion of said differential housing with respect to said frame.

6. Apparatus according to claim 1 wherein said second isolator means is positioned in the only direct load-transmitting path between said differential housing and said frame.

7. A drive train mounting arrangement for a wheel-supported traction vehicle having a frame and a unitized drive train including an engine, transmission means, differential means including a differential housing and axle shaft means operably interconnected for transmitting rotary power from said engine means to a drive wheel means along a fixed power transmission path,
said mounting arrangement comprising:
axle housing means connected to said wheel means,
first connector means connecting said axle housing means to said frame in a manner to prevent any substantial vertical oscillation of said axle housing means with respect to said frame,
second connector means including first isolator means resiliently connecting said engine to said frame,
and means resiliently supporting said differential housing on said frame including second isolator means interposed between said differential housing and said frame in a manner such that loads imposed on said drive wheel means are transmitted directly to said axle housing means and said frame and isolated from said engine, differential housing and portions of said drive train supported by said engine and differential housing.

8. A drive train mounting arrangement for a wheel-supported traction vehicle having a frame and a unitized drive train including an engine, transmission means, differential means including a differential housing and axle shaft means operably interconnected for transmitting rotary power from said engine means to a drive wheel means along a fixed power transmission path,
said mounting arrangement comprising:
axle housing means connected to said wheel means,
first connector means connecting said axle housing means to said frame in a manner so as to prevent substantial vertical oscillation of said axle housing means with respect to said frame,
second connector means including first isolator means resiliently connecting said engine to said frame,
and means separating said differential housing from said axle housing means in a manner such that torsional loads transmitted by said drive wheel means to said axle housing means and said frame are isolated from said engine, differential housing and portions of said drive train supported by said engine and differential housing.

9. A mounting arrangement according to claim 8 wherein said drive wheel means includes a pair of drive wheels, said differential means being positioned between said drive wheels, said axle housing means comprising a first axle housing extending between one of said drive wheels and said differential means and a second axle housing extending between the other of said drive wheels and said differential means, both of said axle housings being rigidly and fully supported by said frame.

10. A mounting arrangement according to claim 8 wherein said differential housing includes means supporting said differential housing on said axle housing means in a manner such that said axle housing means supports said differential housing on said frame, said separating means being interposed between said differential housing and said axle means to isolate said differential housing from axle housing loads.

11. In a ground-engaging traction vehicle having a frame, drive wheel means supported by an axle housing means connected to said frame, and a drive train including an engine, transmission means, differential means including a differential housing and axle shaft means for transmitting rotary power from said engine means to said drive wheel means,
a drive train mounting arrangement comprising:
connector means including first isolator means resiliently connecting said engine means to said frame,
and means supporting said differential housing on said frame including second isolator means interposed between said differential housing and said frame in a manner so as to provide a resilient support for said differential housing on said frame, and so as to isolate said differential housing from said axle housing means and said frame so that wheel loads transmitted by said drive wheel means to said axle housing means and said frame are isolated from said engine and differential housing,
said drive wheel means including a pair of drive wheels,
said differential means being positioned between said drive wheels,
said axle housing means comprising a first axle housing extending between one of said drive wheels and said differential means and a second axle housing extending between the other of said drive wheels and said differential means,
both of said axle housings being rigidly connected to said frame.

12. In a ground-engaging traction vehicle having a frame, drive wheel means supported by an axle housing means connected to said frame, and a drive train including an engine, transmission means, differential means including a differential housing and axle shaft means for transmitting rotary power from said engine means to said drive wheel means,
a drive train mounting arrangement comprising:
connector means including first isolator means resiliently connecting said engine means to said frame,
and means supporting said differential housing on said frame including second isolator means interposed between said differential housing and said frame in a manner so as to provide a resilient support for said differential housing on said frame, and so as to isolate said differential housing from said axle housing means and said frame so that wheel loads transmitted by said drive wheel means to said axle housing means and said frame are isolated from said engine and differential housing,
said differential housing including a differential sleeve means extending inwardly of said axle housing means,
said second isolator means being interposed between said differential sleeve means and said axle housing means in a manner so as to support said differential housing on said axle housing means and thereby indirectly on said frame,
whereby in the event of failure of said second isolator means said differential housing is supported directly by said axle housing means on said frame.

13. In a ground-engaging traction vehicle having a frame, drive wheel means supported by an axle housing means connected to said frame, and a drive train including an engine, transmission means, differential means including a differential housing and axle shaft means for transmitting rotary power from said engine means to said drive wheel means,
a drive train mounting arrangement comprising:
connector means including first isolator means resiliently connecting said engine means to said frame,
and means supporting said differential housing on said frame including second isolator means interposed between said differential housing and said frame in a manner so as to provide a resilient support for said differential housing on said frame, and so as to isolate said differential housing from said axle housing means and said frame so that wheel loads transmitted by said drive wheel means to said axle housing means and said frame are isolated from said engine and differential housing,
said drive wheel means including a pair of drive wheels,
said differential means being positioned between said drive wheels,
said axle shaft means including a pair of axle shafts extending from said differential means to said pair of drive wheels,
said axle housing means including a pair of separate axle housings each extending between said differential means and one of said drive wheel means in surrounding relationship to one of said axle shafts,
means connecting each of said axle housings rigidly to said frame,
bearing means rotatably connecting said axle shafts one to each of said axle housings,
said differential housing having a pair of sleeve portions extending one within an inner end of each said axle housing between said axle housing and its associated said axle shaft,
said second isolator means including a pair of elastomer bushing means, one extending between each of said differential housing sleeve portions and their respective axle housings so as to permit relative rotational and linear movement between said axle housings and said differential housing and so as to resiliently support said differential housing on said axle housing,
whereby wheel and brake loads transmitted by said drive wheels to said axle housings and frame are isolated from said differential housing and connected drive train components.

14. In a ground-engaging traction vehicle having a frame, drive wheel means supported by an axle housing means connected to said frame, and a drive train including an engine, transmission means, differential means including a differential housing and axle shaft means for transmitting rotary power from said engine means to said drive wheel means,
a drive train mounting arrangement comprising:
connector means including first isolator means resiliently connecting said engine means to said frame,
and means supporting said differential housing on said frame including second isolator means interposed between said differential housing and said frame in a manner so as to provide a resilient support for said differential housing on said frame, and so as to isolate said differential housing from said axle housing means and said frame so that wheel loads transmitted by said drive wheel means to said axle housing means and said frame are isolated from said engine and differential housing,
said axle housing including a differential supporting portion in surrounding relationship to a supported portion of said differential housing,
said second isolator means being interposed between said supporting and said supported portions.

* * * * *